United States Patent [19]

Kray

[11] Patent Number: 4,481,178

[45] Date of Patent: Nov. 6, 1984

[54] PURIFICATION OF CHLOROSILANES

[75] Inventor: William D. Kray, Burnt Hills, N.Y.

[73] Assignee: General Electric Company, Waterford, N.Y.

[21] Appl. No.: 439,784

[22] Filed: Nov. 8, 1982

[51] Int. Cl.³ ............................................. C01B 33/08
[52] U.S. Cl. ..................................................... 423/342
[58] Field of Search ........................................ 423/342

[56] References Cited

U.S. PATENT DOCUMENTS 3,069,239  12/1962  Winter et al. ....................... 423/342

Primary Examiner—Paul F. Shaver
Attorney, Agent, or Firm—Hedman, Gibson, Costigan & Hoare

[57] ABSTRACT

A method for the selective removal of phosphorus and other Lewis base-type impurities from chlorosilane solutions with selected transition metal compounds which react with the impurities and allow subsequent distillation of chlorosilane which is virtually free from contamination within extremely low limits of detectability.

10 Claims, No Drawings

PURIFICATION OF CHLOROSILANES

BACKGROUND OF THE INVENTION

This invention relates to the preparation of trichlorosilane for the manufacture of electronic grade silicon and, more particularly, to novel methods for removing trace impurities of electrical donor contaminants, especially phosphorus and other Lewis base or proton acceptor-type impurities.

Silicon of extremely high purity is required for sophisticated electronics uses such as in semiconductors and transistors. It is well known that even trace impurities can seriously impair the performance of silicon-containing electronic components.

Elemental silicon for semiconductor use is generally prepared by reduction of silicon halides, such as silicon tetrachloride ($SiCl_4$), trichlorosilane ($HSiCl_3$) and dichlorosilane ($H_2SiCl_2$), with hydrogen, zinc, sodium or metal hydrides. Silicon may also be derived from thermal decomposition of silane ($SiH_4$), but this latter material is hard to work with because it burns explosively on contact with air.

One of the most difficult impurities to remove from high purity silicon is phosphorus. Whereas other impurities such as copper, iron and manganese are comparatively easy to remove by conventional techniques (e.g., zone refining, crystal pulling), phosphorus has physical properties so similar to silicon that separation is accomplished only by repeated trials. Moreover, concentrating purification efforts on the starting materials, e.g., chlorosilanes, is likewise difficult because phosphorus forms corresponding compounds with similar properties.

Previously proposed methods for the removal of phosphorus and like impurities from silicon or silicon halide materials typically involve adsorption of impurities by contact with solid, hydrated oxymetal complexing agents, or formation of stable addition compounds followed by deposition or distillation of pure silicon or silicon halide. U.S. Pat. Nos. 2,971,607 (Caswell), 3,069,239 (Winter et al.), 3,071,444 (Theuerer), 3,188,168 (Bradley) and British Pat. No. 929,696 (Siemens-Schuckertwerke Aktiengesellschaft); for instance, describe such treatments. Improved processes are also disclosed in commonly assigned, copending U.S. application Ser. Nos. 449,763 and 439,783, filed Dec. 14, 1982 and Nov. 8, 1982, respectively. However, problems with regeneration of impurities and lack of adaptability to large-scale use are experienced with some of these methods.

SUMMARY OF THE INVENTION

It has now been discovered that phosphorus chlorides (chlorophosphines) and other Lewis bases or n-type impurities can be removed almost totally from chlorosilane solutions by contacting the impurities with selected transition metal compounds. The compounds react or complex with the impurities to form thermally stable compounds which are left behind in a distillation of the chlorosilane.

Accordingly, it is an object of the present invention to provide a novel method for purifying chlorosilanes such as dichlorosilane, trichlorosilane, silicon tetrachloride or mixtures thereof.

It is another object of the present invention to provide a method for removing phosphorus trihalides, Lewis base and proton acceptor-type compounds from chlorosilane solutions.

It is another object of the present invention to provide a purification method which is irreversible and adaptable to conventional purification systems.

It is another object of the present invention to provide a means of obtaining electronic grade silicon from high purity trichlorosilane.

These and other objects are accomplished herein by a method for purifying chlorosilanes comprising:
(A) contacting a solution of chlorosilane contaminated with Lewis base impurities with a small amount, sufficient to form thermally stable complexes with said impurities, of a transition metal compound; and thereafter
(B) removing purified chlorosilane by distillation.

DETAILED DESCRIPTION OF THE INVENTION

The method of the present invention involves contacting the chlorophosphine or similar Lewis base impurities present in a chlorosilane solution with a transition metal compound and applying heat and pressure if necessary, to yield a thermally stable phosphorus-containing complex, and then distilling the pure chlorosilane off, leaving the complex-bound impurities behind. This method is very effective for removing phosphorus contaminants, especially from solutions of trichlorosilane. The phosphorus concentration in a solution of trichlorosilane can be reduced by the treatment of the present invention to less than one part per million (ppm).

For the purposes herein, a "Lewis acid" is any substance that will take up an electron pair to form a covalent bond (i.e., "electron-pair acceptor"). This includes the "proton donor" concept of the Lowry-Bronsted definition of acids. Thus boron trifluoride, for example, ($BF_3$) is a typical Lewis acid, as it contains only six electrons in its outermost electron orbital shell. $BF_3$ tends to accept a free electron pair to complete its eight-electron orbital. Conversely, a "Lewis base" is a substance exhibiting an excess of electrons, or with a tendency to donate electrons to form a covalent bond. Phosphorus trichloride ($PCl_3$), for example, is considered a Lewis base, as it has a free electron pair to donate to a covalent bond.

Phosphorus and other elements exhibiting free electrons, which form Lewis base compounds, are of particular interest to producers of semiconductor grade silicon because once incorporated into the crystalline silicon matrix, the excess electrons change the (neutral) electrical character of the crystal and also interfere with any doping agents incorporated therein to give the crystal semiconductor properties. Because their excess electrons contribute a negative charge, phosphorus and like impurities are referred to as "n"-type (negative) impurities. It is n-type impurities, especially phosphorus and other Group V elements, which are effectively eliminated by the process of the present invention.

The term "transition metal compounds" as used herein is meant to encompass certain molybdenum-containing compounds and anhydrous covalent nickel compounds which react with $PCl_3$ and other Lewis bases in chlorosilane solutions to form stable complexes having a higher boiling point than the solution to be purified, such that pure chlorosilane may be distilled from the reaction mixture, leaving behind the transition metal/impurity complexes. These transition metal compounds include selected molybdenum compounds, such as molybdenum dichloride, dioxide, which complex with Lewis bases and are not inhibited by chlorosilanes; they also include anhydrous covalent nickel compounds which are soluble in the chlorosilane solution. Suitable nickel compounds include bis(cyclopentadienyl)nickel, nickel acetylacetonate, and the like. Molybdenum dichloride dioxide and bis(cyclopentadienyl)nickel are preferred.

The transition metal compounds are added to the contaminated chlorosilane solution in an amount that will ensure reaction of the compounds with the Lewis base impurities. Best results, in terms of reaction time and complete removal of impurities, are obtained if this amount is a molar excess, for example 2–50 times, based on the concentration of the contaminant; however, any amount of the compound suitable to effectively bind the impurities present in the solution is contemplated.

After the transition metal compound is mixed into the solution, the mixture is heated to drive the reaction of the compound with the Lewis base impurities. At very high temperatures, i.e., temperatures over 150° C., there may occur some degradation of the complex. At low temperatures the reaction may not be sufficient to effectively remove all of the impurities. For these reasons a reaction temperature range from 0° C. to about 125° C. is preferred, although binder temperatures are also contemplated so long as the reaction products will not be distilled in the same fraction as the chlorosilane, and thereby confound the purification. Best results have been obtained at about 100° C. Raising the pressure within the reaction vessel is also contemplated in order to prevent premature distillation of the chlorosilane. Simple experimentation to arrive at the optimal reaction temperature and pressure for a given set of conditions is contemplated.

As mentioned before, the reaction is allowed to proceed until substantially all of the impurities are bound to transition metal compounds. The time will of course vary according to materials used, temperature used, pressure, etc. Simple experimentation will readily lead to the optimum reaction period for a given purification.

The final step in the purification of the present invention is to distill the pure chlorosilane from the reaction solution. The decreased volatility of the complexed impurities compared to the chlorosilane makes this final distillation possible.

The distillation may be carried out at atmospheric pressures or at higher pressure so long as the temperature of the liquid material does not exceed the decomposition temperature of the complexes formed earlier in the process. It is preferred to maintain the temperature of the solution below about 200° C.

In order that persons skilled in the art may readily understand the practice of the instant invention, the following example is provided by way of illustration, and not by way of limitation.

EXAMPLE 1

To a solution of 400 parts by weight trichlorosilane containing 1.57 parts by weight phosphorus trichloride ($PCl_3$) were added 8.31 parts by weight molybdenum dichloride dioxide. The mixture was heated to 100° C. under 100 psig pressure. After 6 hours the reaction vessel was vented and the vapors condensed. Analysis of the liquid condensate showed that any $PCl_3$ remaining was below the detectability of the analytical method.

I claim:

1. A method for purifying chlorosilanes selected from the group consisting of silicon tetrachloride, trichlorosilane, dichlorosilane, and mixtures thereof comprising:
   (A) adding to a solution of chlorosilane contaminated with Lewis base impurities a 2-fold to 50-fold molar excess, based on the concentration of impurities, of a transition metal compound;
   (B) heating the solution at temperatures below about 150° C. until formation of thermally stable complexes between said impurities and said transition metal compound occurs, under sufficient pressures to prevent distillation of the chlorosilane; and
   (C) removing purified chlorosilane from the solution by distillation at temperatures below about 200° C. and at pressures such that the distillation conditions do not cause decomposition of said stable complexes.

2. The method of claim 1 wherein said impurities contain phosphorus.

3. The method of claim 2 wherein said impurities include phosphorus trichloride.

4. The method of claim 1 wherein the chlorosilane is trichlorosilane.

5. The method of claim 1 wherein the transition metal compound is selected from the group consisting of molybdenum dichloride dioxide and anhydrous covalent nickel compounds.

6. The method of claim 5 wherein the transition metal compound is molybdenum dichloride dioxide.

7. The method of claim 5 wherein the transition metal compound is bis(cyclopentadienyl)nickel.

8. The method of claim 1 wherein the transition metal compound is added to a concentration of 2–50 times the molar concentration of the Lewis base impurities.

9. The method of claim 1 wherein the chlorosilane is trichlorosilane, the Lewis base impurities are predominantly phosphorus trichloride, the transition metal compound is selected from molybdenum dichloride dioxide or bis(cyclopentadienyl)nickel, and the transition metal compound is added in a concentration of about 3 times that of the phosphorus trichloride impurity.

10. A method for producing trichlorosilane substantially free of phorphorus impurities from high purity trichlorosilane solutions comprising:
   (A) adding to a solution of trichlorosilane containing small amounts of phosphorus impurities a 2-fold to 50-fold molar excess, based on the concentration of the impurities, of a transition metal compound selected from the group consisting of molybdenum dichloride dioxide and anhydrous convalent nickel compounds;
   (B) heating the solution at temperatures below about 150° C. until said impurities and said transition metal compound form thermally stable complexes, under pressures sufficient to prevent distillation of the trichlorosilane; and
   (C) removing purified trichlorosilane from the solution by distillation at temperatures below about 200° C. and at pressures such that the distillation does not cause decomposition of said stable complexes.

* * * * *